(No Model.)
H. S. BLACKMORE.
PROCESS OF MAKING ALUMINIUM SULFID.
No. 605,812. Patented June 14, 1898.
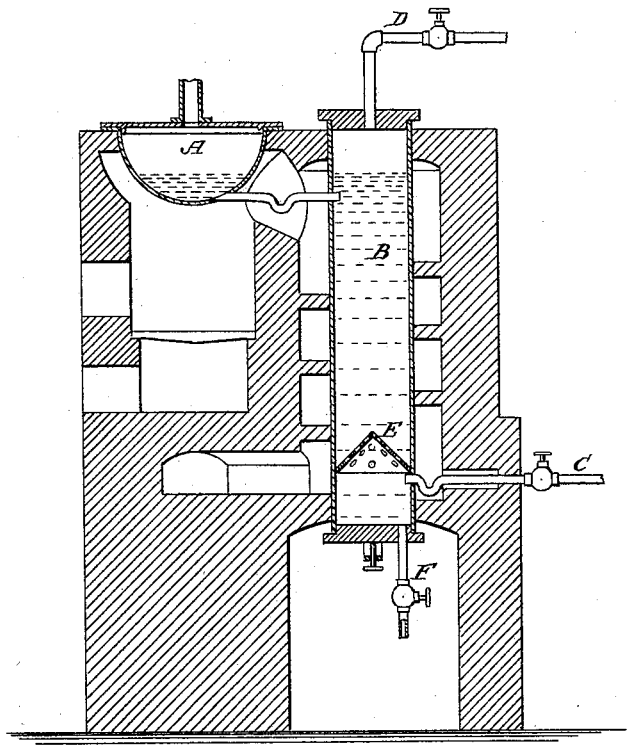
WITNESSES:
E. Wolff
Chas. E. Poensgen
INVENTOR:
Henry S. Blackmore
BY
Hauff & Hauff
ATTORNEYS.

UNITED STATES PATENT OFFICE.

HENRY S. BLACKMORE, OF MOUNT VERNON, NEW YORK, ASSIGNOR TO THE PURE ALUMINIUM AND CHEMICAL COMPANY, OF WEST VIRGINIA.

PROCESS OF MAKING ALUMINIUM SULFID.

SPECIFICATION forming part of Letters Patent No. 605,812, dated June 14, 1898.

Application filed December 21, 1893. Renewed April 21, 1898. Serial No. 678,430. (No specimens.)

*To all whom it may concern:*

Be it known that I, HENRY S. BLACKMORE, a citizen of the United States, residing at Mount Vernon, in the county of Westchester and State of New York, have invented new and useful Improvements in Processes of Producing Aluminium Sulfid, of which the following is a specification.

It is well known that aluminium oxid (alumina $Al_2O_3$) may be decomposed when heated in the presence of vaporized carbon disulfid $CS_2$; but it has been found that the particles of heated aluminium oxid exposed to the action of the carbon-disulfid vapor become coated with a thin film of aluminium sulfid, which prevents any further reaction.

The object of my invention is to cause the entire body of the aluminium oxid to be acted upon and decomposed by the carbon disulfid, and in order to attain this object I expose the aluminium oxid in a liquefied state to the combined action of carbon and sulfur, as hereinafter described.

The accompanying drawing represents a vertical section of an apparatus which I can use with advantage in carrying out my invention.

The following is an example in which my invention can be carried out in practice.

I take a mixture of cryolite and potassium fluorid in proportion of two parts, by weight, of the former to one part of the latter and place it into a caldron A, where it is heated until it has become a fused mass. Into this fused mass I introduce gradually aluminium oxid, and after the aluminium oxid has been dissolved and assumed a liquefied state I introduce the fused mixture into the retort B, which is exposed to heat, so that its contents remain in a fused state, and then I pass through this fused mass carbon disulfid in the form of vapor or gas, which is introduced through the pipe C and passes up through the perforations in the false bottom E. By the action of the sulfur vapors the aluminium oxid is transformed into aluminium sulfid ($Al_2S_3$,) while the oxygen of the aluminium oxid combines with the carbon and forms oxysulfid of carbon (COS) when the carbon disulfid is in excess. This oxysulfid of carbon is conducted away and afterward treated to produce carbon disulfid for further action. If, however, the carbon disulfid is not in excess, the whole of the sulfur may be absorbed by the aluminium of the aluminium oxid, producing aluminium sulfid and carbon dioxid, which can be allowed to escape through the pipe D. By the combined action of the sulfur and carbon vapors upon the alumina in a dissolved or liquefied state the formation of a film of aluminium sulfid is avoided and the entire mass of aluminium oxid can be transformed into aluminium sulfid, which may be withdrawn from time to time through the pipe F. If a suitable supply of the dissolved or liquefied alumina to the retort B is kept up, the operation can be carried on without interruption. The aluminium sulfid thus obtained is mixed with more or less of the fused flux present, which, however, serves to render the aluminium sulfid easier fusible, while at the same time they do not injure the product when utilizing the same for the production of the metal aluminium, as the aluminium sulfid can be reduced to metallic state without decomposing or affecting the bath of fluorid for future use in transforming further quantities of aluminium oxid into sulfid.

What I claim as new, and desire to secure by Letters Patent, is—

1. The process of transforming aluminium oxid into aluminium sulfid which consists in exposing a fused bath containing dissolved aluminium oxid to the action of carbon-bisulfid vapor or gas substantially as described.

2. The process of transforming aluminium oxid into aluminium sulfid which consists in liquefying aluminium oxid by the action of heat and fused solvent fluxes, then exposing the liquefied aluminium oxid to the action of carbon-bisulfid vapor or gas substantially as described.

3. The process for transforming aluminium oxid into aluminium sulfid which consists in fusing a mixture of cryolite (aluminium sodium fluorid) and potassium fluorid dissolving therein aluminium oxid and exposing the liquefied aluminium oxid to the action of carbon-bisulfid vapor or gas substantially as described.

4. The process for transforming aluminium oxid into aluminium sulfid which consists in passing carbon-bisulfid vapor or gas through a molten bath capable of liquefying aluminium oxid and introducing aluminium oxid into the same substantially as described.

In testimony whereof I have hereunto set my hand in the presence of two subscribing witnesses.

HENRY S. BLACKMORE.

Witnesses:
WM. C. HAUFF,
E. F. KASTENHUBER.